Patented June 8, 1948

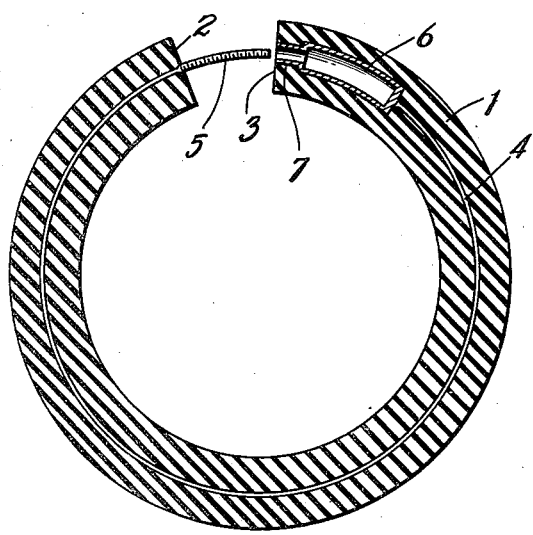
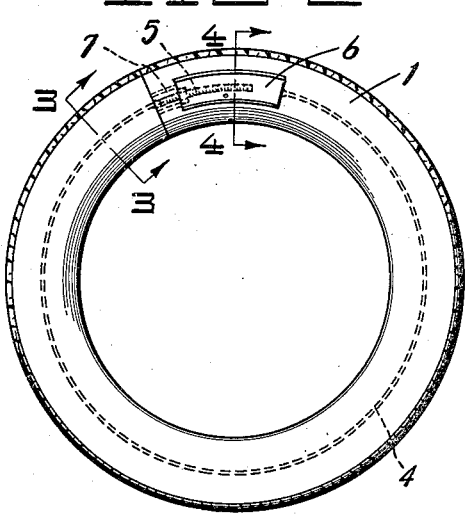
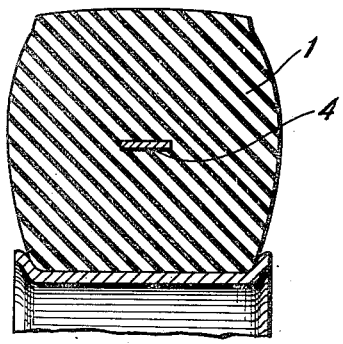
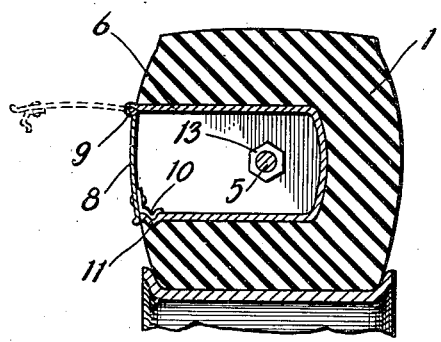
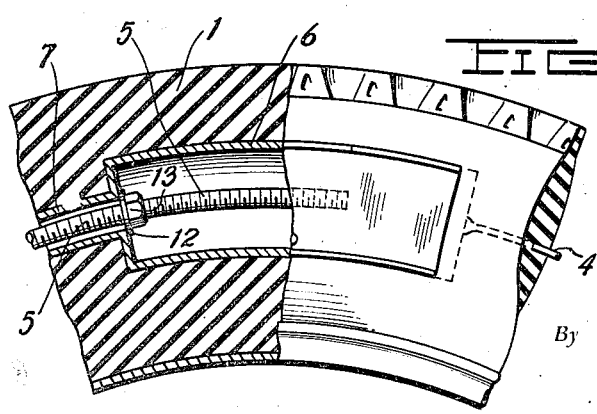

2,442,996

UNITED STATES PATENT OFFICE 2,442,996

EMERGENCY TIRE

Reuben T. Conley, Millington, Md.

Application December 8, 1945, Serial No. 633,722

2 Claims. (Cl. 152—389)

1

This invention relates to an emergency tire for automobiles or other vehicles and has for its object to provide a solid tire with means for easily and quickly attaching and detaching the same in place of the usual pneumatic tire when the pneumatic tire has become deflated or when both the tire on the automobile and the spare tire are deflated, thus making it unnecessary to drive home on the wheel rim.

An object of my invention is to provide an improved emergency tire for automobiles which may be substituted for a pneumatic tire when the same has become deflated, and which may be quickly and easily mounted upon the automobile wheel rim and locked thereon for a temporary substitute for the pneumatic tire, to prevent the necessity of running the automobile on the rim.

Another object of my invention is to provide an improved emergency tire for automobiles and other vehicles, which will consist of a hard rubber tire split transversely and having embedded therein suitable means for reinforcing the same and for fastening the adjacent edges of the tire together when placed upon the rim of an automobile.

A still further object of my invention is to provide an improved emergency tire for automobiles which will consist of a hard rubber tire split transversely and having means embedded in the tire within the lateral limits thereof, whereby the tire may be secured upon an automobile rim and readily demounted therefrom after the need for an emergency tire is over.

Other objects will appear as the description proceeds.

In the accompanying drawings which form a part of my application:

Figure 1 is a sectional view taken through the complete tire showing the reenforcing band within the tire and the means for fastening the ends of the band together;

Figure 2 is a side elevation of my improved emergency tire;

Figure 3 is a transverse sectional view taken on the line 3—3 of Figure 2;

Figure 4 is a transverse sectional view taken on the line 4—4 of Figure 2, and

Figure 5 is an enlarged view partly in section showing the fastening means for securing the adjacent ends of the tire together when placed upon an automobile rim.

Like characters of reference are used throughout the following specification and the accompanying drawings to designate corresponding parts.

2

In carrying out my invention I provide a circular body or tire 1, which is split transversely to form the adjacent ends 2 and 3 which will be provided with suitable means hereinafter described for securing the ends together when the emergency tire is placed upon the rim of an automobile, and for separating the said means when it is desired to remove the emergency tire from the rim after the same has been used and it is desired to replace the pneumatic tire which had become deflated.

A steel band 4 is embedded throughout the circumferential body or tire 1 and it is suitably connected to a threaded bolt 5 which extends beyond the end of the tire. The threaded bolt 5 may be secured to the steel band 4 as by welding, or in any other desired manner.

A rigid box 6 is embedded within the tire and is connected to the opposite end of the steel band 4 in any desired manner, as for example by welding, and is provided at its opposite end with a reduced guide collar or portion 7 which terminates at the other end of the tire body.

The rigid box 6 extends to the outer side wall of the tire body 1, and is provided with a cover member 8 which is hinged at 9 to the said box 6. A latch mechanism 10 is provided on the free end of the cover whereby the same may be latched into a keeper groove 11 formed in the bottom of the box 6.

From the foregoing description it will be seen that when it is desired to replace a deflated pneumatic tire with my improved emergency tire, it is only necessary to remove the pneumatic tire and to place the circular emergency tire when the ends are opened over the automobile wheel rim, at which time the threaded bolt will be inserted through the reduced guide collar 7 and a washer 12 placed over the bolt within the rigid box 6 and a threaded nut 13 tightened up on the bolt, which action will draw the adjacent ends of the emergency tire into close proximity one with the other thereby forming a continuous band or tire upon which the automobile may run until the deflated pneumatic tire has been repaired.

It is further seen that access may be readily had to the adjusting or tightening means for the emergency tire by simply pulling the latch mechanism from the keeper groove in the box and by raising the cover so that ready access may be had in the tightening of the nut on the bolt or conversely.

While I have illustrated and described my preferred embodiment of my invention, it will be understood that I do not intend to limit myself to these specific constructions illustrated and described, being limited only by the scope of the claims as many minor changes in detail of construction may be resorted to without departure from the invention.

Having thus described my invention which I claim as new and desire to secure by Letters Patent of the United States is:

1. An emergency tire comprising a circular body split transversely at one point to provide relatively adjustable ends, reenforcing means embedded in said tire circumferentially thereof, an arcuate threaded bolt secured to one end of said reenforcing means and extending beyond the adjacent end of the tire body, a rigid metal box secured to the opposite end of the reenforcing means and embedded within the tire body, with one side open and extending flush with the outer side wall of the tire body, a cover hinged to said box for closing the same, a latch for said cover, and means for guiding the threaded bolt into said box.

2. An emergency tire comprising a circular body slit transversely at one point to provide relatively adjustable ends, reenforcing means embedded in said tire circumferentially thereof, an arcuate threaded bolt secured to one end of said reenforcing means and extending beyond the adjacent end of the tire body, a rigid metal box secured to the opposite end of the reenforcing means and embedded within the tire body, with one side open and extending flush with the outer side wall of the tire body, a cover hinged to said box for closing the same, a latch for said cover, said box being formed with an integral reduced arcuate guide tube on its end opposed to the end connected with said reinforcing means, said guide tube extending to the adjacent end of said slit body and adapted to guide the threaded bolt in said box, and a washer and nut engageable with the threaded bolt in said box adapted to seat on the end of said reduced tube for holding the ends of the tire body in close proximity one with the other.

REUBEN T. CONLEY.

REFERENCES CITED

The following references are of record in the file of this patent:

UNITED STATES PATENTS

| Number | Name | Date |
| --- | --- | --- |
| 616,833 | Fagan | Dec. 27, 1898 |
| 1,299,342 | Hines | Apr. 1, 1919 |

FOREIGN PATENTS

| Number | Country | Date |
| --- | --- | --- |
| 10,808 | Great Britain | 1911 |